March 13, 1951 J. L. CASSELL 2,545,259

MULTIPLE RADIO HETERODYNE DISTRIBUTION SYSTEM

Filed Oct. 5, 1946 4 Sheets-Sheet 1

INVENTOR
JOSEPH LAWRENCE CASSELL
BY Pennie, Edmonds, Morton & Barrows,
ATTORNEYS March 13, 1951 J. L. CASSELL 2,545,259

MULTIPLE RADIO HETERODYNE DISTRIBUTION SYSTEM

Filed Oct. 5, 1946 4 Sheets-Sheet 2

INVENTOR
JOSEPH LAWRENCE CASSELL
BY
Pennie, Edmonds, Morton & Barrows.
ATTORNEYS MULTIPLE RADIO HETERODYNE DISTRIBUTION SYSTEM
Filed Oct. 5, 1946 4 Sheets-Sheet 3
Fig. 3,
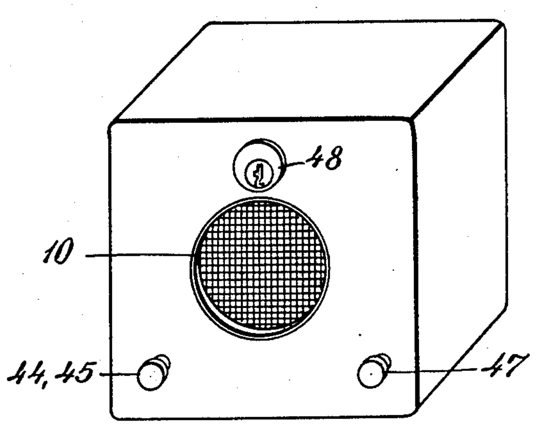
Fig. 4,
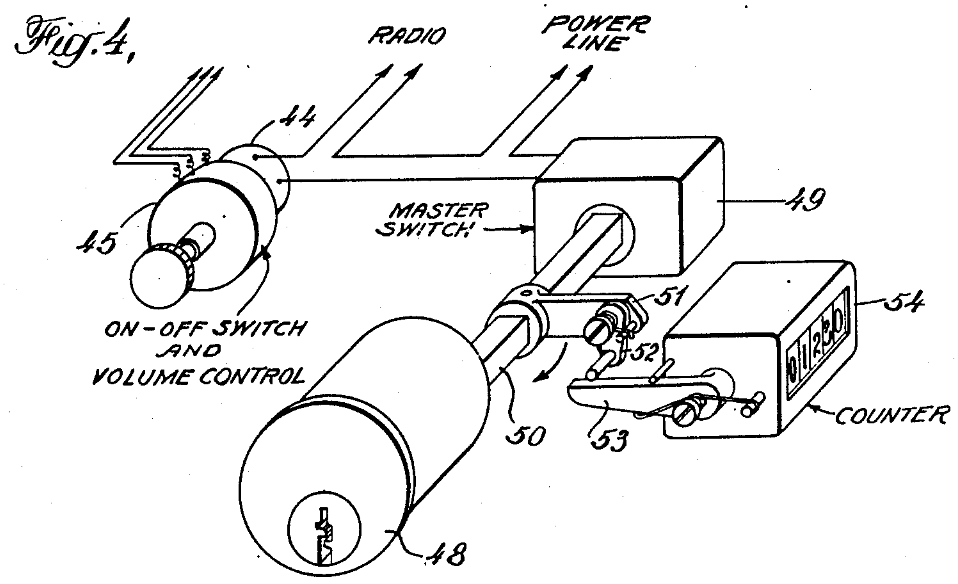
INVENTOR
JOSEPH LAWRENCE CASSELL
BY
Pennie, Edmonds, Morton & Barrows
ATTORNEYS

MULTIPLE RADIO HETERODYNE DISTRIBUTION SYSTEM

INVENTOR
JOSEPH LAWRENCE CASSELL
BY
Pennie, Edmonds, Morton & Barrows
ATTORNEYS

Patented Mar. 13, 1951 2,545,259

UNITED STATES PATENT OFFICE 2,545,259

MULTIPLE RADIO HETERODYNE DISTRIBUTION SYSTEM

Joseph Lawrence Cassell, New York, N. Y., assignor to Monmouth Laboratories, Inc., Bradley Beach, N. J., a corporation of New Jersey Application October 5, 1946, Serial No. 701,569

10 Claims. (Cl. 179—2.5)

This invention relates to signal distribution systems and to methods of distributing radio or similar signals from a central station over power lines to remote receiving stations connected to such power lines.

More specifically, the present invention includes methods and means for distributing signals which may comprise music, voice, or television, for example, over power lines with a minimum of equipment and with complete freedom from interference from power line disturbances.

It has heretofore been proposed to distribute over power lines within a building, for example, to receivers at points within the building, programs received from radio broadcast stations. This has been called carrier frequency wire broadcasting. Such prior systems have required receiving the radio broadcast signals, heterodyning them with a locally generated frequency, demodulating them into audio-frequency signals and employing the audio-frequency signals to re-modulate a locally generated carrier frequency which is then impressed on the power line. This method has, therefore, involved three different frequencies, namely, the original frequency of the received broadcast signals, the frequency of the local oscillator included in the heterodyne receiver at the central station, and a third frequency which is that of the second local oscillator which generates the carrier frequency above mentioned. As a result of these three frequencies simultaneously employed in the central station unit in heterodyne relation to each other, a large number of undesirable beating harmonics are generated. In an attempt to avoid the undesirable effects of such harmonics in the distribution system, the use of complicated apparatus has been proposed, in many instances resulting in unsatisfactory reception of signals at certain frequencies within the desired range.

By means of the present invention the required apparatus has been considerably simplified, and at the same time greatly improved operation has been achieved. The invention makes possible for the first time, the reception of programs or signals from as many sources as desired regardless of the frequencies thereof. Each of these programs or signals is then heterodyned with a local oscillator to generate a lower intermediate frequency wave which, after amplification, is impressed directly on the electric power line already presumed to be in place in the building or other location. This power line, and any branches thereof, may be tapped at as many receiving points as desired where the intermediate frequency wave is selected, amplified, detected and reproduced, as by a loudspeaker, for example. The electric power required to operate the apparatus of the entire system may all be drawn from the same power lines which carry the programs or signals, and yet with complete freedom from noises or interference due to the use of such common power line. Both the central station apparatus and the remote receiving apparatus may be completely portable, the only necessary connections between them or to the power lines being made by means of the usual two-prong attachment plugs to any wall-type receptacles. Furthermore, the invention contemplates the automatic control from the central control station of one or more of the remote receiving stations, permitting the receiving station or stations to be turned on and off from the central station by a novel use of the same intermediate frequency waves employed to carry the radio or other programs. Heretofore all such remote control arrangements have necessitated the use of a separate control frequency and of additional control equipment responsive to such separate control frequency.

The remote control system in accordance with this invention is especially applicable to installations requiring occasional use of some or all of a large number of receivers such as in hotels, factories or other large buildings, railway terminals, and the like. However, it is also useful in small installations, such as homes wherein one or more receivers and loudspeakers may be situated at the most effective locations, and the control station including a tuner, and phonograph, if desired, be located at a convenient remote point, as at the side of a chair.

A more complete understanding of this invention and of the many new and valuable results to be achieved therefrom will be had from a consideration of the following specification, taken together with the drawings in which:

Fig. 3 is a perspective view of one form of a remote receiver useful in connection with the present invention;

Fig. 4 is a perspective view of the lock switch, volume control, and counter mechanism adapted for use in connection with the receiver of Fig. 3;

Figure 1:
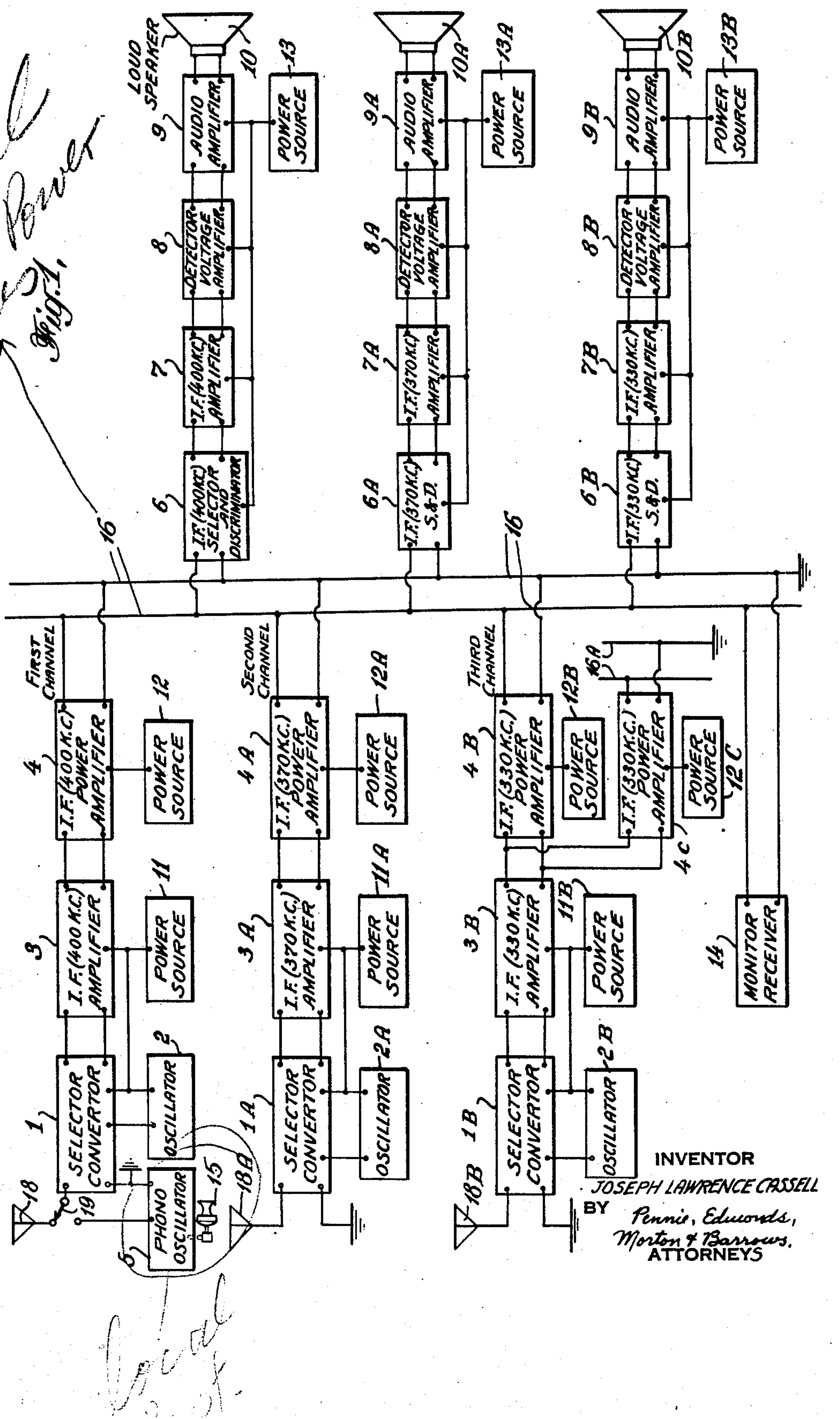
Fig. 1 is a block diagram of a distribution system in accordance with the invention.

The block diagram of Fig. 1 illustrates the general arrangement of a signal distribution system in accordance with the invention. The system, as illustrated, provides for the simultaneous distribution over a commercial power line, as in a building, of three different radio signals such as might be simultaneously received at a central control station from three different broadcasting stations. The diagram also shows the simultaneous reception of the signals from these three different broadcasting stations at three different remote points connected or coupled to the same power line or branches thereof.

Power line 16 may be assumed to be the main feeder in a power distributing system in a building such as a hotel, for example, it being also assumed that radio broadcast signals are to be impressed thereon. Accordingly, in connection with the present invention, a selector-converter 1 located at the central station is arranged to be coupled to a suitable antenna 18. Selector 1 is capable of being tuned to any desired frequency, such as within the broadcast frequency range. Signals at this desired frequency are heterodyned in the converter in this unit with oscillations locally generated by oscillator 2, to produce an intermediate and lower frequency, such as 400 kilocycles. Such intermediate frequency would be generated, for instance, if the incoming broadcast signal is of 500 k. c. and the local oscillator is of 900 k. c., the difference being 400 k. c. The signals at the intermediate frequency are preferably amplified by a so-called intermediate-frequency amplifier which is well known in the art, and usually, especially in a large installation where the receiving points are separated by considerable distances, a further intermediate frequency amplifier of the power amplifier type also well known in the art may be employed. These two amplifiers are represented in the diagram of Fig. 1, as I. F. amplifier 3 and power amplifier 4, respectively. It has been found expedient to furnish necessary operating voltages to the selector-converter 1 and the intermediate frequency amplifier 3 by a suitable power source 11. It is assumed that this power source 11, and all of the other power sources herein represented, derive their own electric power from the main power line 16 or from branches thereof. Power amplifier 4 is represented as being furnished with power from the source 12 which is separate from source 11, but such separate source might not be required. The foregoing apparatus is assumed to be located at the central station. The intermediate-frequency signals (at 400 k. c. in this example) appearing at the output of power amplifier 4 are now of fairly large amplitude and may be directly coupled to power line 16, over which they will flow.

These intermediate-frequency signals at 400 k. c. in the power line may then be tapped off at any desired remote point at which a selector 6, tuned to the same intermediate frequency, is located. This selector may also include a discriminator, later to be explained in more detail, which, in accordance with this invention, is extremely effective in excluding the many undesirable "noises" such as clicks and buzzes which universally occur in power line carrier systems. The discriminator is so arranged that any desired intermediate frequency will, nevertheless, be picked up from the power line and impressed on a suitable intermediate-frequency amplifier 7. Signals appearing at the output of amplifier 7 are then impressed on a detector 8 which usually would also include an amplifier of the voltage type well known in the art. The output from such detector-amplifier combination, as represented at 8, may then be coupled into the input of audio amplifier 9 of suitable characteristics to feed audio signals into a reproducer, such as loudspeaker 10. For furnishing suitable operating potentials to all of the individual units 6–9, inclusive, a power source 13 is provided.

In some large installations, such as hotels or factories, and also in certain small installations such as private homes, it is frequently desirable to include in the system a local source of signals, such as a phonograph, or microphone into which announcements can be made. For these purposes a phonograph oscillator 5 and a microphone 15 may be provided. A phonograph oscillator of the type herein contemplated is well known in the art and provides facilities for reproducing phonograph records in the form of a signal-modulated carrier wave. Thus the output of phono-oscillator 5 would correspond to radio broadcast signals picked up by antenna 18. It is therefore required merely to shift signal switch 19 from the antenna to the phono-oscillator in order to impress on the power line 16 signals derived from phonograph records. Microphone 15 is arranged to be plugged into a jack in phono-oscillator 5 whereby speech or music picked up by the microphone may likewise cause modulated carrier waves to be impressed on selector-converter 1. Obviously, similar phono-oscillator and microphone units may be connected into the other transmission channels now to be described.

To make more clear the general application of the present invention, the fundamental central station units 1—4 and the remote receiver station units 6—10 are shown to be twice duplicated. Consequently, the central station apparatus comprising units 1A—4A, 1B—4B, respectively, may be considered to be similar and to have similar functions to those having corresponding reference characters just above described. The duplicate units A and B may, of course, be located at the same control point as is selector-converter 1 or they may be at different control points. Likewise they may or may not employ the same antenna. Especially in a large installation, as might be employed in a hotel, it is usually necessary to include a monitor receiver 14 at the central control station. This receiver is preferably connected to the power line 16 and may comprise apparatus equivalent to that represented in the receiver first described as comprising units 6–10, inclusive. If this monitor receiver is tunable over the entire range of frequencies of the system, any signals which can be received anywhere in the system can be selected for monitoring or checking at the central control station.

To provide a better illustration of the flexibility of the system in accordance with the present invention, an additional power line 16A is represented in Fig. 1. This power line might be assumed to be a branch line, for example, so remote from the main feeder 16 that signals of adequate amplitude would not be impressed on it, even though it is coupled or connected to feeder 16. Again, it might comprise a power line in the same premises but fed from a separate power source. For this purpose, a branch connection from the output of intermediate frequency amplifier 3B is connected into an intermediate frequency amplifier 4C comprising a power amplifier which may be a substantial duplicate of amplifier 4B. This amplifier 4C is then coupled to feeder or branch line 16A in the same manner that amplifier 4B is coupled to power line 16. A separate power source 12C is shown to furnish the necessary power to operate amplifier 4C, and it may be assumed that source 12C obtains its power from power line 16A.

In the diagram of Fig. 1 it is assumed for purposes of illustration that a given broadcast station at 500 k. c. is selected by selector 1, and is heterodyned to an intermediate frequency of 400 k. c., which frequency, in turn, is impressed on power line 16. Of course, selector 1 being tunable over the broadcast range, for example, and the frequency of oscillator 2 being in the usual manner automatically tunable therewith, any desired broadcast frequency may be selected or received by selector 1, and the converted signals impressed on power line 16 at 400 k. c. Hence the signals from any source which are selected and amplified in the first or upper channel in the diagram, Fig. 1, will be converted to 400 k. c. (in this example) and as such will be impressed on the power line. Similarly, converter 1A and its associated units in the second or middle channel represented in the diagram of Fig. 1, will convert the signals received by it to 370 k. c. (in this example) and these signals will also be impressed on power line 16 at that intermediate frequency. Similarly, with respect to the third or bottom channel represented in Fig. 1, signals from any source and at any frequency selected by selector 1B, will be converted to an intermediate frequency of 330 k. c. (in this example) and will also be impressed on power line 16 or power line 16A at that frequency.

The three receivers represented as including selectors 6, 6A, 6B, respectively, are marked as being adjusted to 400 k. c., 370 k. c. and 330 k. c., respectively. In other words, the receiver of selector 6 will, in the illustrated arrangement, receive exclusively signals to which selector 1 is tuned, that the receiver in which selector 6A is included will receive exclusively signals to which selector 1A is tuned, and that the receiver including selector 6B will receive exclusive signals to which selector 1B is tuned. However, it will be evident that other tuning arrangements may be employed as may be required by any particular installation. For example, the receiving apparatus may be adjustably tunable, if desired, so that, instead of being set for a normally fixed frequency, it may be adjusted by the user to receive any of several intermediate frequencies which may be impressed on the power line 16. Furthermore, it is contemplated in accordance with this invention that in installations, as in a hotel, for example, there may be any number of intermediate frequencies, such as the three intermediate frequencies indicated in Fig. 1, impressed on the power line, and a single receiver in each guest room provided with fixed-tune circuits selectable by a switch or push buttons in well known manner so that any one of these three or more intermediate frequencies may be selected by the user of the receiver to permit selection of the programs from all of those impressed upon the power line at the central station. An arrangement of this sort is specifically illustrated in the circuit diagram of Fig. 2, which will now be described.

Figure 2:
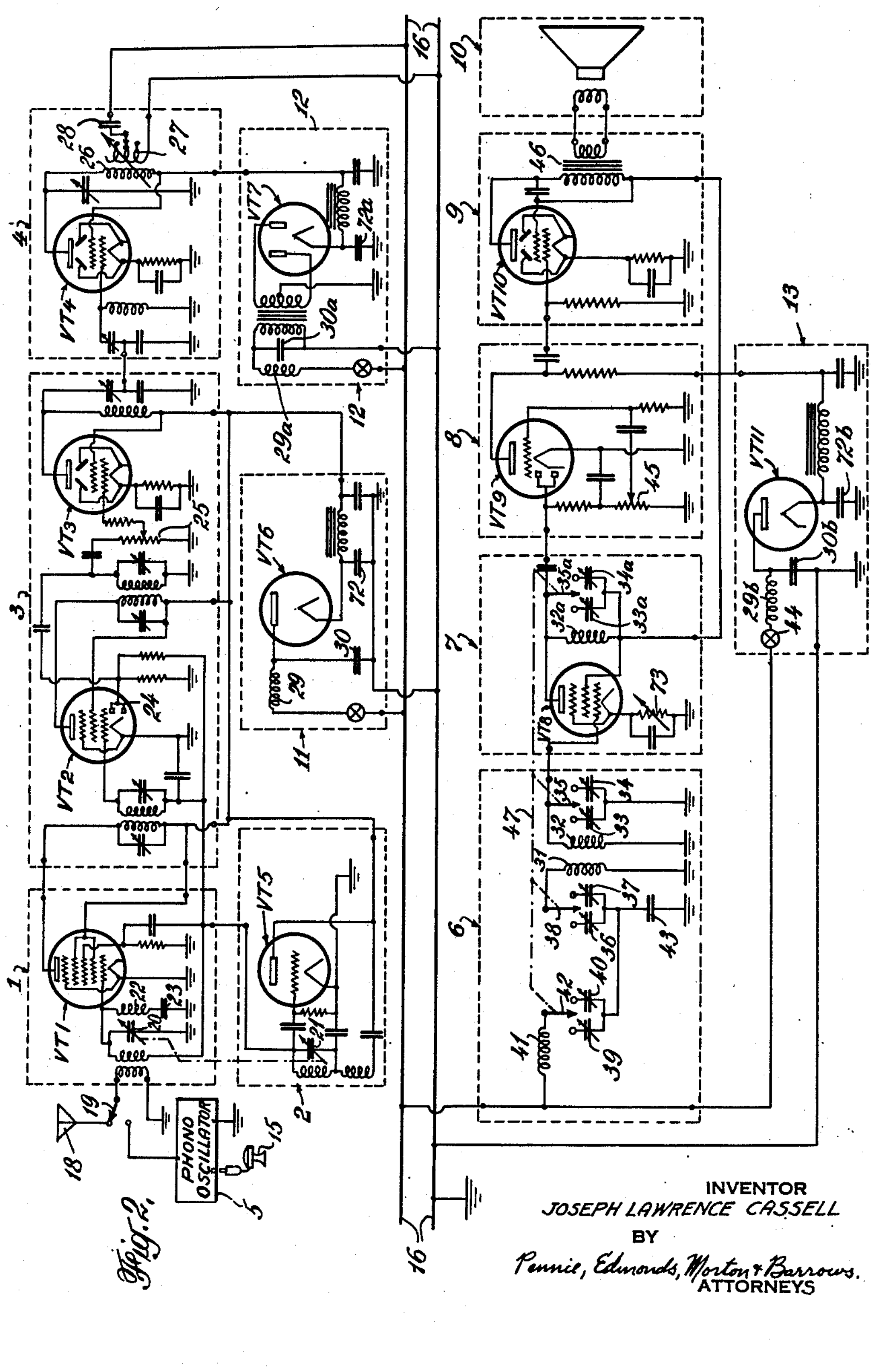
Fig. 2 is a circuit diagram of the principal circuit units represented in the block diagram of Fig. 1.

The circuit diagram of Fig. 2 corresponds to the units represented in block diagram form in the upper or first channel of Fig. 1, and therefore includes units 1 to 13, inclusive. Much of the apparatus here represented is well known in the radio and associated electronic arts and will require no detailed explanation. However, in order that those skilled in the art may more readily construct and use a system in accordance with the present invention, the following information may be helpful.

Selector-converter 1 includes a vacuum tube VT1 which may be of the 12SK7 type, the radio-frequency input circuit of which is tunable by variable condenser 20 which is coupled in unicontrol arrangement to condenser 21 connected in the tunable circuit of oscillator 2. This oscillator 2 includes a vacuum tube VT5 which may be, for example, of the 12J5 type. The output of the converter or mixer tube VT1 is coupled by a tuned transformer to the input of tube VT2. Inductance 22 and condenser 23 are connected in series across the input electrodes of tube VT1 and are tuned to resonance at the intermediate frequency of the first channel, here 400 k. c. These elements thus constitute a wave trap for the intermediate frequency of the channel in which they are connected to prevent undesirable results of feedback at the intermediate frequency.

Intermediate frequency amplifier 3 includes vacuum tubes VT2 and VT3. Tube VT2 may be of the voltage amplifier type, such as type 12C8. The input and output circuits of these amplifiers would in this instance be tuned to 400 k. c. Tube VT2 includes rectifier electrodes 24, which are connected in a conventional manner to provide automatic volume control.

Amplifier tube VT3 may be of the medium power type such as type 35A5. It is convenient in this stage to include a potentiometer 25 for adjusting the gain of the amplifier, and thus for controlling the amplitude of the signals impressed upon power line 16. It may here be mentioned that in some distribution systems of the type herein contemplated, especially when employed in connection with hotel and hospital installations for example, it is important that the maximum signal strength available at the receivers shall be limited to that which will restrict the sound output from the loudspeakers to a level calculated not to be annoying to other persons in the vicinity, for example in adjacent rooms. Consequently, in such an installation the volume control 25 would be set to provide signals of such level in the power line 16 as to be below what might be called the "annoyance level" when reproduced by the loudspeakers associated therewith.

The last amplifier stage 4, at the central control station, is coupled by suitably tuned coupling circuits to the output of amplifier 3, and may include a power amplifier tube, such as type 6L6. The output of amplifier 4 is coupled by a suitably tuned circuit, as shown, to the power line 16. This latter coupling circuit includes a primary winding 26 of impedance suited to the anode resistance of tube VT4. Winding 26 is coupled to the secondary winding 27 which is connected in series with condenser 28 and the power line, it being preferable to connect condenser 28 to the ungrounded side of the power line. It is convenient to make secondary winding 27 adjustable with respect to the number of its effective turns connected in circuit so that it may be tuned at least approximately to the frequency to be transferred (here 400 k. c.); and also, it is desirable to arrange windings 26 and 27 so as to have adjustable inductive coupling therebetween. In distribution systems installed in fairly small premises, power amplifier stage 4 *might not* be required at all, in which event the output coupling elements 26, 27 and 28 could be connected in the output of tube VT3.

For furnishing power in the form of high-potential direct current to the anodes of the various vacuum tubes above mentioned, two power rectifiers are shown in the diagram, namely, the rectifiers included in power sources 11 and 12. Power source 11 furnishes operating potentials to tubes VT1, VT2, VT3 and VT5, whereas power source 12 furnishes operating potential to tube VT4. Power sources 11 and 12, as shown, basically comprise rectifier tubes and output filters of conventional types, tube VT6 being a diode of the 35Z3 type, and rectifier tube VT7 being a full-wave rectifier tube of the 5Y3 type.

Both of these power sources 11 and 12 include an additional feature which has been found to be of considerable importance in connection with the present invention. It has already been explained that one of the advantages of this invention is that the power line upon which the signals are impressed is also employed to furnish the electrical power to operate all of the apparatus in the system. It has been found that when a rectifier, whether of the vacuum, gas, or dry plate type is connected to such a power line in the normal manner, the signal fluctations in the line are modulated by the periodic conduction of the rectifier at the power line frequency. This effect can produce extremely disagreeable "frying" sounds in the loudspeakers of the receivers, and this effect has in the past been obviated only by employment of a different system altogether or by employment of elaborate circumventions. However, in accordance with the present invention the entire difficulty has been overcome by shunting the input to the rectifier with a capacity offering low impedance at the carrier frequency employed and by connecting in series between the power line and the input of the rectifier an impedance of fairly high value at that frequency. For example, in the illustrated case of 400 k. c., the shunt condenser 30 could be of about 0.1 microfarad and inductance 39 of about 2.5 millihenries. By employing for element 29, an impedance which includes D. C. resistance of as much as 75 ohms, or so, the same filter element also functions as a current-limiter for the rectifier. Such current-limiter is required in the arrangement shown largely because of the effect of the sudden rush of charging current into filter condenser 72 on the positive half cycles. Filter condenser 72 is usually of very large capacity—frequently of as much as 50 microfarads—and the charging current into such a capacity might be many times the safe current-carrying capacity of the rectifier. Choke 29 of Fig. 2 may be assumed to be of that type. It has been found that a pure resistance of about 100 ohms (D. C.) may be employed as element 29, but it is preferable that this element also provide an A. C. reactance of a few thousand ohms. The description just given will also apply to elements 30*a*, 29*a* and 72*a* in the full-wave two-electrode rectifier power source 12.

A typical remote receiver is illustrated in the lower portion of Fig. 2 as being connected both to receive signals and to receive its electric power from power line 16. This receiver is here shown to comprise a selector-discriminator unit 6, later to be described, an intermediate frequency amplifier 7, detector and voltage amplifier 8, audio-frequency power amplifier 9, and loudspeaker 10. A suitable power source 13 is provided to furnish operating potentials to the vacuum tubes employed in the receiver.

Selector-discriminator 6, which includes a novel arrangement of circuit elements in accordance with this invention, makes possible the selection of the desired intermediate-frequency carrier waves and the elimination of undesired waves of the transient type which universally exist in electric power lines. These transient disturbances are characterized by having steep wave fronts, and are reproduced by the loudspeaker as clicks and buzzes. They are initiated by the switching on and off of, and the operation of, various types of loads on the line. This type of interference has in the past been eliminated only by sacrificing the tuning range of the receiver, or by greatly attenuating the received signals from the power line, or both. On the other hand, the arrangement according to this invention makes possible the substantially complete elimination of such transient interference without restricting the tuning range and while maintaining a high level of received signals. To this end the selector-discriminator unit 6 comprises a selector circuit portion consisting of transformer 31, 32, the secondary 32 of which is tuned by condenser 33 or 34 as selected by tuning switch 35. If these tuning condensers were of the continuously variable type to be manipulated by the user, only one would be required (see Fig. 7). It is here assumed that they are of the so-called adjustable type which may be adjusted once and for all to any desired frequency to which it is intended that the receiver should respond, and that the receiver may thereafter be caused to respond to that or other preselected frequencies by suitable push button or other type of switch, such as switch 35.

Condensers 36 and 37, corresponding to condensers 33 and 34, may be adjusted to slightly different actual values because, as shown, they are connected in series with fixed condenser 43 which is of a large value, condenser 43 and either of condensers 36 and 37 being connectible in series across primary winding 31. The circuit including winding 31, condenser 43 and either of condensers 36 and 37 thus in tuned to the desired frequency to be received. Inductance coil 41 which is connected to the power line, in order to tap off signals therefrom, is connected in series with either of tuning condensers 39 and 40 and the large condenser 43, which is grounded. Condensers 39 and 40 are also proportioned so as to tune the circuit 41—43 to the frequency desired to be received. The circuit elements 31, and 36 to 43, inclusive, constitute a discriminator circuit portion which, because of the mechanical linkage between switches 35, 38 and 42, is automatically tunable with the selector circuit portion constituting circuit elements 32 and 33 or 34. As above indicated, if it be desired to tune the receiver over a continuous frequency range, instead of employing three groups of two or more adjustable condensers each, each condenser group could be replaced by a single variable condenser, and the adjustable plates of the several condensers could be uni-controlled.

The discriminator circuit portion operates in the following manner: Fixed condenser 43 is considerably larger than the effective maximum capacity of condenser 39 or condenser 40 and for the same reason is considerably larger than the maximum capacity of condenser 36 or condenser 37. For example, the capacity ratio might be of the order of 1,000 to 1. Thus, the interfering signal waves are discriminated against with respect to the desired signal waves by the same ratio, viz., 1,000 to 1. To attain this ratio in connection with the 400 k. c. signal frequency already assumed, condensers 39 and 40 might be of the order of 100 micro-microfarads, and the capacity of condenser 43 might be of the order of 0.1 microfarad. This discrimination against transient voltages results from the fact that the transient voltage may build up across coil 41 or across condenser 39 (or condenser 40), but is not transferred to or built up across inductance 31, because the impedance to ground of condenser 43 is negligible with respect to the transient voltage and coil 31 is not tuned to its frequency. However, the coil 41 and condenser 39 together are tuned to the desired frequency and coil 31 and condenser 36 together are tuned to the same desired frequency. Hence a voltage at this frequency will be built up across coil 31 and will be induced in coil 32.

Intermediate-frequency amplifier 7 includes voltage amplifier tube VT8 for which type 12SK7 is suitable. The output circuit of this tube includes a tuned circuit comprising a winding 32*a* shunted by either of tuning condensers 33*a* and 34*a* which may be selected by switch 35*a*. These tuning elements may, respectively, be similar to those above described in connection with the preceding tuned circuit, and hence have been given corresponding reference characters. As indicated on the diagram, it is preferable that tuning control switch 35*a* be mechanically coupled to switches 35, 38 and 42 so as to be actuated by a uni-control 47.

The tuned circuit 32*a*—34*a* is coupled to the input of a detector, voltage-amplifier stage 8 which includes, as shown in the drawing, a vacuum tube VT9 which may be of type 12SQ7. In the amplifier circuit of this tube a manual volume control 45 is included to permit the operator or listener to adjust the amplification, and thus the volume of sound reproduced by loudspeaker 10, up to a maximum limit which will, as previously explained, depend upon the adjustment of volume control 25 at the central station. Additionally, in many installations, it is necessary to include a master volume control in the receiver. A suitable resistor 72 for such purpose is shown connected in the cathode return lead to amplifier tube VT8. Such a control would be adjustable only inside of the receiver cabinet and permits the gain of the receiver to be compensated for the signal strength obtaining at the location of the particular receiver. The signal strength from any given central station is usually different at various locations throughout a large building.

The output of voltage amplifier 7 comprising signals at audio-frequency, is coupled, in turn, to the input of power amplifier 9. This is an audio amplifier and includes a suitable vacuum tube VT10, such as the type 50L6, the output of which is coupled through output transformer 46 to loudspeaker 10.

Power source 13 provided to furnish the required operating potentials to the vacuum tubes VT8, VT9, VT10 of the receiver, includes a rectifier VT11, which may be of the type 35Z3, for example. Connected between the input of this vacuum tube VT11 and the power line 16 is a control switch 44, and a filter 29*b*, 30*b*, for the purposes above described in connection with filter 29—30 connected to the input of vacuum tube VT6.

It has already been pointed out that the present invention has wide applicability. However, the preferred embodiment herein illustrated, is especially suitable for use in installations such as hotels or hospitals wherein a large number of receivers may be employed periodically, and usually upon payment of a rental charge.

A receiver of the type shown in Fig. 2, especially adapted to such installations, is shown in Fig. 3 which represents an external view of the cabinet of such a receiver. This receiver is in external appearance conventional in that it includes a tuning control 47, a loudspeaker 10, and a manual control knob at the left, manipulation of which operates both the on-off switch 44 and the volume control 45, above discussed in connection with Fig. 2. On the cabinet at the top is a lock 48 in which a key of the "Yale" type may be inserted. The nature of this lock and its function will be understood by reference to Fig. 4, which shows behind the lock 48 within the cabinet a lock switch or master switch 49 connected in series between the on-off switch 44, the power input to the radio, and the power line itself. From the diagram of Fig. 4 it will be seen that unless switch 49 is closed the radio receiver cannot be operated. Hence, in the case of the hotel installation herein referred to, when a receiver is rented, a hotel employee will close switch 49 by turning a key inserted in lock 48. The turning of this key to close switch 49, rotates shaft 50 which is attached to the cylinder of the lock at the rear. Rotation of shaft 50 clockwise, in the direction of the arrow, will rotate trip arm 51 downwardly which, in turn, urges trip member 52 in the same direction and this depresses counter lever 53, rotating the actuating shaft of counter 54 and causing the counter to register one digit. At a subsequent occasion when the key is again inserted in lock 48 and rotated in the opposite direction, trip arm 51 will be rotated counterclockwise and trip member 52 being itself pivoted on arm 51 will swing around the end of counter lever 53 without affecting that lever, and will return to the initial position shown in Fig. 4. Such reverse rotation of shaft 50 will open master switch 49 thus putting the receiver in an inoperable position. Counter 54 will thus register the number of times that the receiver has been turned on and will facilitate the necessary accounting and charges to be made in connection with the same.

Figure 5:
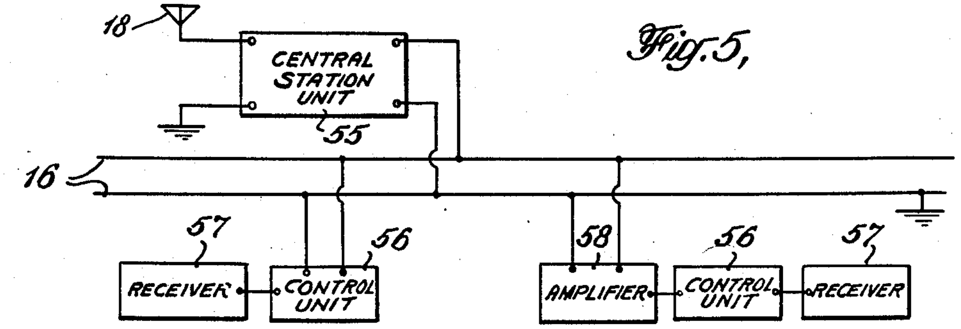
Fig. 5 is a block diagram of an automatic remote control system which is part of this invention.
Figures 6, 7:
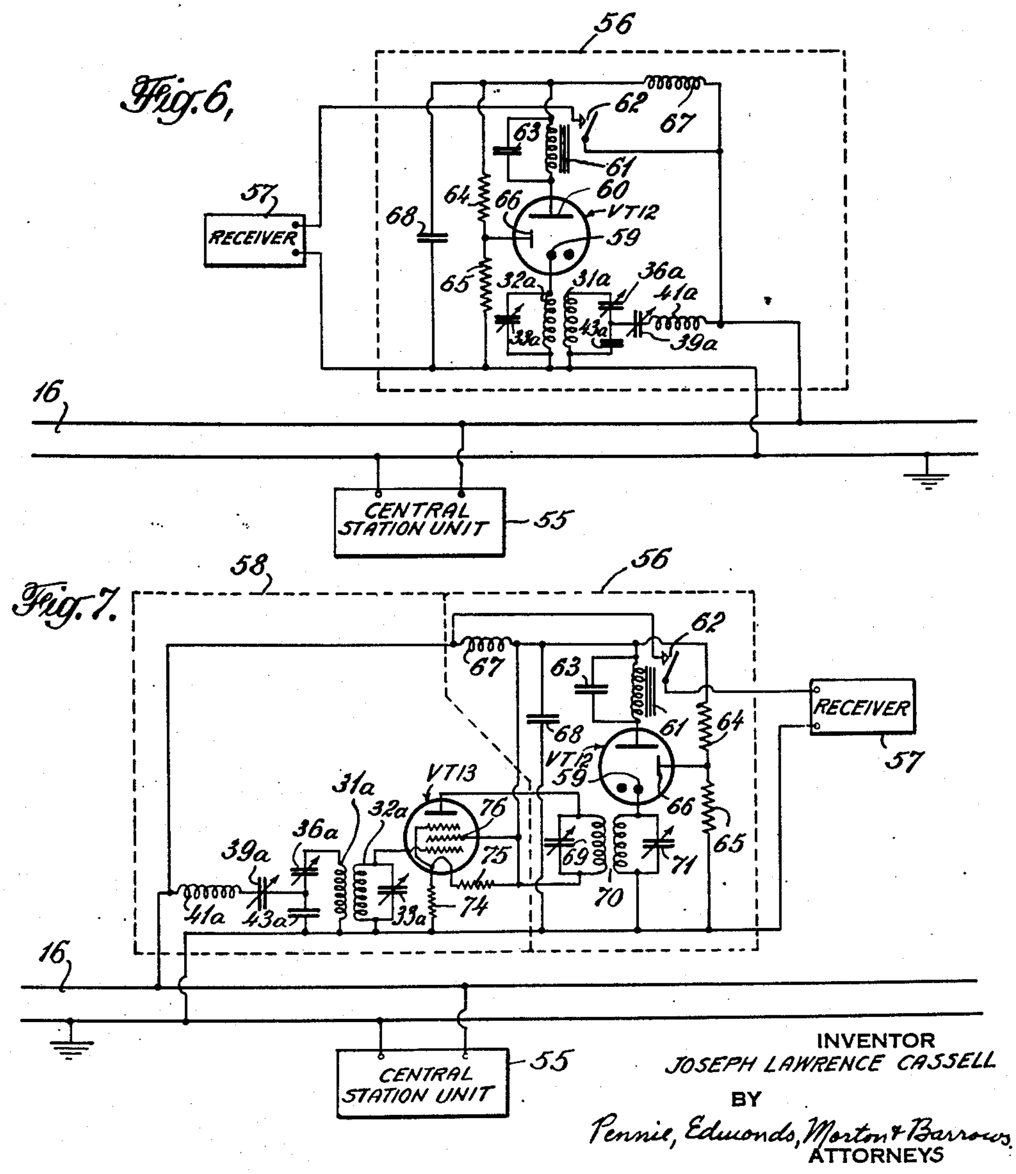
Fig. 6 is a schematic circuit diagram of a simple remote control system as in Fig. 5.
Fig. 7 is a schematic circuit diagram of the remote control system of Fig. 6 to which has been added an amplifier for the control signals, as also represented in Fig. 5.

The remote control feature of this invention, illustrated in Figs. 5, 6 and 7, is, like the other features already described, of wide applicability. Those skilled in the art will at once appreciate the value of a communicating system in accordance with this invention wherein the power lines already existing for power transmission purposes may be employed not only for furnishing operating power to all of the required communication apparatus, but also for carrying and distributing throughout the premises serviced by such power lines, radio programs or other signals simultaneously from any required number of sources. It will, likewise, be appreciated that the value of such a system would be greatly enhanced by the inclusion of means utilizing the same power lines and the same carrier frequencies employed in transmission of the mentioned signals to control from any given central control point the operation of, viz., the turning on and off of, any desired receivers connected to the power line and suitably equipped for the purpose. It may, therefore, be understood that the receivers represented in Figs. 1, 2 and 3 may be modified to include either of the control units now to be described to permit such remote control operation.

Referring to the block diagram of Fig. 5, there is represented a central station unit 55 which may be assumed to correspond to any of those above described in connection with the preceding figures. This central station is coupled to the power line 16, as before, and this power line or a branch thereof, instead of being coupled directly to the input of a receiver 57 as above described, is coupled to a control unit 56, which, in turn, is coupled to the receiver 57 thereby to turn it on and off in response to carrier waves of a predetermined frequency in the power line 16. Such an arrangement is shown to the left of Fig. 5, below power line 16.

A modification of the remotely controlled receiver just described is represented at the right of Fig. 5, below power line 16, which shows a corresponding receiver 57 and control unit 56, but wherein a suitable amplifier 58 is interposed between power line 16 in the input of control unit 56. Both of these remote control units will be described below.

Referring to Fig. 6, the circuit of the control unit 56 comprises a suitable gas tube VT12 of the cold cathode type, such as OA4G. The input to the tube VT12 includes a selector-discriminator similar to selector-discriminator 6 of Fig. 2. The circuit elements of these selector-discriminators can be similar and have similar functions and therefore have been designated with reference characters (31*a*, 32*a*, 33*a*, 36*a*, 43*a*, 39*a*, 41*a*) corresponding to those employed in Fig. 2. This selector-discriminator circuit is connected to the power line 16 from which carrier waves at an intermediate frequency may be selected and interfering transient waves will be rejected. Otherwise power line disturbances, especially those of the transient type, might cause tube 59 to fire accidentally and cause undesired operation of the control unit.

In series with the anode 60 of tube VT12 is connected the winding of a relay 61. Relay contacts 62 are closed by actuation of the relay which, in turn, connects receiver 57 to the power line 16. In this manner, both operating power and signals are impressed on the receiver, as is clear from Fig. 2. Condenser 63 connected across winding 61 is of sufficiently large capacity (say, about 25 microfarads) to prevent chattering of the relay on the negative cycle when the gas tube VT12 is not conducting. This arrangement also permits the use of a comparatively simple and, therefore, cheap relay which thus can be caused to remain closed as long as 30 seconds, if need be, after the received carrier wave has ceased. It is usually desirable to employ a relay having a slow-opening action, viz., fast make and slow break, to insure the relay's remaining closed in tuning from one station to another, as well as to permit a shift from one carrier wave to another in a two-way communicating system to which the invention is equally applicable.

Resistors 64 and 65 are connected in series effectively across the line and their junction point is connected to the control electrode 66, forming a voltage divider which maintains electrode 66 at a critical potential (a potential of about 60 volts is appropriate for the tube mentioned) so that an increase of potential on cathode 59 will ignite or fire the tube. Such increase of potential is impressed on cathode 59 when a potential at the received intermediate frequency is built up across coil 32*a*, as explained in connection with Fig. 2.

Inductance 67 and condenser 68 together form a filter, connected as shown, to prevent periodic firing of the gas tube from modulating the carrier wave signals in the power line. Otherwise the remote control unit might introduce so much interfering "noise" or "hash" in the power line that the receivers connected thereto would be substantially inoperative. Although condenser 68 is shown to be connected across coil 32*a* and the winding of relay 61 in series with tube VT12, it may be considered to be connected, as far as its function is concerned, effectively across the anode and cathode of tube VT12. The filter elements 67, 68 are fundamentally the same and are employed for fundamentally the same purpose as elements 29, 30, etc., in Fig. 2. Consequently, impedance 67 should preferably include sufficient direct-current resistance to function as a current limiter for tube VT12 and at the same time include sufficient impedance at alternating current to prevent condenser 68 from effectively short-circuiting the power line. The high A. C. impedance of element 67 likewise assists in preventing the mentioned "noise" produced by tube VT12 from reaching the power line. As before, a condenser 68 of the order of $\frac{1}{10}$ microfarad is suitable, and a choke coil of the order of 2.5 millihenries is suitable providing it also has a D. C. resistance of the order of about 75 or more ohms. Actually, a direct-current resistance element of approximately 100 ohms can be substituted for the choke coil, but it is preferable that this element have an A. C. reactance of a few thousand ohms at the frequency of the carrier wave to be employed.

From the above description of Fig. 6, it will be seen that normally receiver 57 and control unit 56 draw no power from power line 16. However, upon reception of a carrier wave of a frequency to which the selector circuit of unit 56 is tuned, tube VT12 will fire, actuating relay 61 to close contacts 62 and connecting receiver 57 to the power line. Contacts 62 will remain closed as long as such carrier waves are impressed upon the control unit. Hence when the carrier waves cease, the receiver 57 will be disconnected and the control unit will again cease to draw current from the power line.

From the foregoing description it will be evident that this feature of the present invention is not limited to "intermediate-frequency" carriers, but is equally applicable to high-frequency waves, and particularly to those employed in frequency modulation and in television systems. Hence the component 57, labeled "receiver" may be assumed to comprise any apparatus or device which it is desired to connect to the power line by the control of the same signals which are intended to continue to operate such device 57 after it is connected, and to disconnect such device by the mere discontinuance of such signals. Such remote control system obviously has an unlimited range of application, but by way of example, one such application may be mentioned. In a radio broadcast receiving installation in a large private home, for instance, the central station apparatus capable of receiving broadcast signals may be installed in a comparatively compact, portable cabinet, suitable for location alongside of a chair. This cabinet can be moved about and at any desired location instantly connected to the power line, both in respect to deriving operating current therefrom and to impressing signals on the power line, merely by inserting an ordinary two-prong attachment plug into the usual wall receptacle. Portable remote receivers, each including a loudspeaker, may then be similarly plugged into any power line outlet throughout the house, after which any desired radio signals can be reproduced at will from any one or more of such remote receivers, all of which can be turned on and off, and the volume of the emitted sound controlled, as desired, from the central control station. As previously described, the signals thus transmitted can as well comprise those reproduced from phonograph records, or from a microphone located at the central control station. All of this operation and control can by means of this invention be effected by the sole use of the usual power lines already existing in the premises. If desired, a clock, located at the control station, may be arranged to operate a switch controlling the operation of the central control station itself, so that at a designated time the control station apparatus will be turned on and this, in turn, will, as just explained, turn on any desired remote receiver which will then audibly reproduce any signals previously provided for.

The modification shown in Fig. 7 is, in general, similar to that of Fig. 6. This arrangement is especially applicable to receivers to be remotely controlled at points where the carrier wave may not be of sufficient amplitude to insure reliable firing of the gas tube. This arrangement, therefore, includes an amplifier tube VT13 interposed between the signal input to the gas tube VT12 and the selector-discriminator circuits. In order to minimize the consumption of power current, especially when the remote receiver is not operating, the amplifier tube VT13 should be of the type drawing a minimum of power to heat its cathode. Consequently, it is suggested that a tube of a type usually operated by batteries be employed. Such a tube is type 1N5GT, of which the filament-cathode draws .05 ampere at 1.4 volts. The filament of such an amplifier tube can readily be energized from the power line through series resistors 74, 75. Since the filament operates constantly, the tube is always in condition to amplify signals impressed upon it from the selector-discriminator. Such signals will be suitably amplified and impressed on the coupling circuit 69, 70, 71, which should be adjusted to the frequency intended to actuate the apparatus. Voltage at this selected frequency will, as before, be impressed on cathode 59 to fire the tube and thus will connect receiver 57 to the power line for reproducing signals transmitted thereover, as explained in connection with Figs. 1, 2 and 6.

In Fig. 7 the filter 67, 68 is included for the reasons mentioned in connection with Fig. 6. Here, however, condenser 68 has the dual function of a filter condenser and of a radio-frequency by-pass from the screen grid 76 of tube VT13 and ground.

What is claimed is:

1. In combination with a system for distributing high-frequency signals over an A. C. power line, said system including a signal-amplifying vacuum tube having at least one grid, an anode and a cathode, means for coupling said grid to said power line whereby signals from said power line are impressed on said grid, a power source including a two-electrode rectifier and a smoothing filter connected thereto for furnishing a D. C. operating potential to the anode of said tube, said power source being connectible to said power line to derive its power therefrom, a metallic connection for connecting a first electrode of said rectifier to one side of the power line and a smoothing condenser of large capacitance and hence of large charging current which comprises an element of said filter comprising means for connecting the second electrode of said rectifier to the other side of the power line, means preventing interfering modulation of said signals by said rectifier comprising a condenser of considerably smaller capacitance than that of said smoothing condenser connected in series with said smoothing condenser across the electrodes of said rectifier, and a high-frequency choke coil included in said metallic connection from the first of said electrodes to said power line, said choke coil having an inductive reactance of the order of several thousand ohms and a D. C. resistance such as to limit the charging current into said smoothing condenser to a value within the safe current-carrying capacity of said rectifier.

2. In a system for distributing high-frequency signals over a power line, a signal receiver which is operable by power from said line to receive said signals, and means for automatically connecting said receiver to said power line in response to said signals comprising a gas-filled tube having a control electrode, an anode and a cathode, a selective coupling system effectively connected in circuit between said control electrode and said cathode and including means for coupling said system to said power line, said coupling system being tunable to the frequency of said signals and proportioned to select said signals to the exclusion of transient waves in said line, a relay having a winding connected in circuit with said anode so that said relay is actuated in response to the firing of said tube, and connections from said relay adapted, upon actuation of said relay, to connect said receiver to the power line so as to connect operating power to, and to impress high-frequency signals on, said receiver, and upon deactuation of said relay to disconnect operating power and high-frequency signals from said receiver.

3. In a system for distributing high-frequency signals over a power line, a signal receiver which is operable by power from said line to receive said signals, and means for automatically connecting said receiver to said power line in response to said signals comprising a gas-filled tube having a control electrode, an anode and a cathode, a coupling system effectively connected in circuit between said control electrode and said cathode and coupled to said power line, a relay having a winding connected in circuit with said anode so that said relay is actuated in response to the firing of said tube, connections from the contacts of said relay to said receiver and said power line so that closure of said contacts connects said receiver to said line, and a filter comprising a condenser and a high-frequency choke connected in series across said power line, said relay winding being connected between said anode and the junction of said condenser and choke so that said condenser is effectively connected in shunt to the anode and cathode of said tube, whereby the firing of said tube is prevented from modulating the signals in said power line.

4. A remote control unit adapted to receive its operating power from an electric power line and to be actuated in response to high-frequency signals from said line so as to connect to said power line a high-frequency signal receiver which is operable by power from said line to receive said signals, said unit comprising a gas-filled tube having a control electrode, an anode and a cathode, a selective coupling system effectively connected in circuit between said control electrode and said cathode, and adapted to be coupled to said power line, said coupling system being tunable to the frequency of signals received from the power line and proportioned to select said signals to the exclusion of transient waves in said line, a relay connected in circuit with said anode so as to be actuated in response to the firing of said tube, connections from said relay adapted to connect said receiver to said power line upon actuation of said relay, and a filter comprising a condenser and a high-frequency choke connected in series across power line, said relay being connected between said anode and the junction of said condenser and choke so that said condenser is effectively connected in shunt to the anode and cathode of said tube, whereby the firing of said tube is prevented from modulating the signals in said power line.

5. In a system for distributing high-frequency signals over power lines subject to transient disturbances, a power-line connection, a signal-receiving vacuum tube, a selector-rejector circuit for coupling said vacuum tube to a power line, said circuit comprising a first resonant circuit including a first tuning coil coupled to the input side of said tube, a first adjustable tuning condenser and a filter condenser connected in series with each other across said coil, and a second resonant circuit including a second tuning coil and a second adjustable tuning condenser connected in series with each other between said power line connection and the junction point between said first tuning condenser and said filter condenser, said filter condenser being thereby common to both of said resonant circuits, the capacity of said filter condenser being larger than said tuning condensers to such a degree as to offer negligible impedance to said transient disturbances, said tuning condensers being proportioned with the coils with which they are respectively associated and with said filter condenser to resonate at the frequency of said signals, whereby said signals are impressed on the input side of said tube to the substantial exclusion of said transients.

6. A system according to claim 5 wherein the capacity of said filter condenser is of the order of one thousand times the capacity of each of said tuning condensers.

7. In a system for distributing radio programs over power lines subject to interfering steep-front transient waves, a central station including a source of radio-frequency signals, means for selecting from said source signals of a desired frequency, an oscillator, a converter for heterodyning the output of said oscillator with the selected signals to form an intermediate frequency lower than that of the selected signals, an intermediate-frequency amplifier connected to amplify signals from said converter, and means tuned to said intermediate frequency coupling the output of said amplifier to a power line; and a receiving station including a signal-receiving vacuum tube, a selector-rejector circuit for coupling said vacuum tube to a power line, said circuit comprising a first resonant circuit including a first tuning coil coupled to the input side of said tube, a first adjustable tuning condenser and a filter condenser connected in series with each other across said coil, and a second resonant circuit including a second tuning coil and a second adjustable tuning condenser connected in series with each other between said power line connection and the junction point between said first tuning condenser and said filter condenser, said filter condenser being thereby common to both of said resonant circuits, the capacity of said filter condenser being larger than said tuning condensers to such a degree as to offer negligible impedance to said transient disturbances, said tuning condensers being proportioned with the coils with which they are respectively associated and with said filter condenser to resonate at the frequency of said signals, whereby said signals are impressed on the input side of said tube to the substantial exclusion of said transients, a detector coupled to the output of said last named amplifier, and audio amplifying and reproducing means coupled to the output of said detector.

8. In a system for distributing radio programs over power lines, a central station including a source of radio-frequency signals, means for selecting from said source signals of a desired frequency, an oscillator, a converter for heterodyning the output of said oscillator with the selected signals to form an intermediate frequency thereof, an intermediate-frequency amplifier connected to amplify signals from said converter, a power line having a grounded side and coupling means impressing said intermediate-frequency signals on said power line; and a receiving station including a resonant circuit adapted to respond to said intermediate frequency, said resonant circuit including a coil and two condensers connected in series effectively across said power line, one of said condensers being of capacity larger than that of the other and being connected to the grounded side of the power line constituting a ground return for the receiver station, a second amplifier for amplifying signal voltage developed by said resonant circuit, a detector coupled to the output of said second amplifier, and signal amplifying and reproducing means coupled to the output of said detector.

9. A system according to claim 8 and including a second resonant circuit linked to said first-mentioned resonant circuit and developing signal voltage which is impressed on said second amplifier, said second resonant circuit including a second coil, a second condenser and said larger condenser, said larger condenser being likewise larger than said second condenser.

10. In combination with a system for distributing high-frequency signals over an A. C. power line, said system including a signal-amplifying vacuum tube having at least one grid, an anode and a cathode, means for coupling said grid to said power line whereby signals in said power line are impressed on said grid, a power source including a two-electrode rectifier and a smoothing filter connected thereto for furnishing a D. C. operating potential to the anode of said tube, said power source being connectible to said power line to derive its power therefrom, means preventing interfering modulation of said signals by said rectifier comprising a condenser connected effectively across the electrodes of said rectifier and connectible on one side to ground and on the other side to one side of said power line, and a high-frequency choke coil connected on one end to the ungrounded side of said condenser and at the other end connectible to the other side of said power line, said high-frequency choke coil comprising a winding of high inductance and of the order of 75 ohms direct-current resistance to limit the current through said rectifier to a safe value.

JOSEPH LAWRENCE CASSELL.

REFERENCES CITED

The following references are of record in the file of this patent:

UNITED STATES PATENTS

| Number | Name | Date |
|---|---|---|
| 1,455,827 | Affel | May 22, 1923 |
| 1,682,000 | Willard | Aug. 28, 1928 |
| 1,687,061 | Bellescize | Oct. 9, 1928 |
| 1,754,878 | Clement | Apr. 15, 1930 |
| 1,840,013 | Benson | Jan. 5, 1932 |
| 1,853,678 | Gage | Apr. 12, 1932 |
| 2,008,279 | Hopkins | July 16, 1935 |
| 2,073,034 | Thyson | Mar. 9, 1937 |
| 2,117,638 | Walter | May 17, 1938 |
| 2,142,874 | Sadowsky | Jan. 3, 1939 |
| 2,151,814 | Tellegen | Mar. 28, 1939 |
| 2,151,884 | Arendt | Mar. 28, 1939 |
| 2,188,508 | Herdman | Jan. 30, 1940 |
| 2,189,287 | Hershey | Feb. 6, 1940 |
| 2,205,469 | Curtis | June 25, 1940 |
| 2,268,812 | Foster | Jan. 6, 1946 |
| 2,400,857 | Turner | May 21, 1946 |
| 2,454,814 | Lehmann | Nov. 30, 1948 |

FOREIGN PATENTS

| Number | Country | Date |
|---|---|---|
| 147,004 | Austria | Sept. 25, 1936 |